(12) United States Patent
Fries et al.

(10) Patent No.: US 9,550,396 B2
(45) Date of Patent: Jan. 24, 2017

(54) TREAD PROFILE OF A PNEUMATIC VEHICLE TIRE FOR UTILITY VEHICLES

(71) Applicant: Continental Reifen Deutschland GmbH, Hannover (DE)

(72) Inventors: Volkmar Fries, Bad Eilsen (DE); Michael Lehn, Celle (DE); Alexander Rediger, Lorentzweiler (LU)

(73) Assignee: Continental Reifen Deutschland GmbH, Hannover (DE)

( * ) Notice: Subject to any disclaimer, the term of this patent is extended or adjusted under 35 U.S.C. 154(b) by 466 days.

(21) Appl. No.: 14/094,762

(22) Filed: Dec. 2, 2013

(65) Prior Publication Data

US 2014/0116588 A1   May 1, 2014

Related U.S. Application Data

(63) Continuation of application No. PCT/EP2012/057721, filed on Apr. 27, 2012.

(30) Foreign Application Priority Data

May 30, 2011  (DE) .................. 10 2011 050 712

(51) Int. Cl.
 *B60C 11/13* (2006.01)
 *B60C 11/03* (2006.01)

(52) U.S. Cl.
 CPC ........ *B60C 11/1353* (2013.04); *B60C 11/0309* (2013.04); *B60C 11/1323* (2013.04); *B60C 2011/1361* (2013.04); *B60C 2200/06* (2013.04)

(58) Field of Classification Search
 CPC ............. B60C 11/1353; B60C 11/1323; B60C 2011/1361
 See application file for complete search history.

(56) References Cited

U.S. PATENT DOCUMENTS

| 5,345,988 A | 9/1994 | Kabe et al. |
| 5,445,201 A * | 8/1995 | Kukimoto ............ B60C 11/042 152/209.19 |

(Continued)

FOREIGN PATENT DOCUMENTS

| DE | 102009003562 A1 * | 9/2010 |
| JP | 2000-177323 A | 6/2000 |

(Continued)

OTHER PUBLICATIONS machine translation for German 102009003562 (no date).*

(Continued)

*Primary Examiner* — Steven D Maki
(74) *Attorney, Agent, or Firm* — Walter Ottesen, P.A.

(57) ABSTRACT

A tread profile has a tread profile section which is in the center of the tire in the axial direction, and in each case one shoulder profile section. The central tread profile section is composed of profile belts, and the shoulder profile sections each have a second profile belt. A circumferential groove is arranged in each case between a first profile belt of the central section and the profile belt of the shoulder section. The groove is formed with a web which is radially raised from the groove base and which divides the groove into a narrow first and a wider second section which has, at the groove base, a linear section of extent which merges, with a curvature radius $R_3$ and $R_2$, with the edges of the profile belt or of the web, wherein $R_3 > R_2$. The linear section of extent is at an angle of inclination $> 0°$.

10 Claims, 3 Drawing Sheets

(56) References Cited

U.S. PATENT DOCUMENTS

| | | | | |
|---|---|---|---|---|
| 5,679,185 | A | * | 10/1997 | Tanaka ............... B60C 11/0302 152/209.26 |
| 2004/0060628 | A1 | | 4/2004 | Grimm |
| 2006/0011280 | A1 | * | 1/2006 | Yagita ............... B60C 11/0306 152/209.24 |
| 2012/0024444 | A1 | * | 2/2012 | Ackermann ......... B60C 11/042 152/209.18 |
| 2012/0042998 | A1 | * | 2/2012 | Ueda .................. B60C 11/0309 152/209.18 |
| 2012/0199258 | A1 | * | 8/2012 | Clayton ............. B60C 11/1323 152/209.18 |

FOREIGN PATENT DOCUMENTS

| | | | |
|---|---|---|---|
| JP | 2001-063316 A | * | 3/2001 |
| WO | WO-2007/028442 A1 | * | 3/2007 |

OTHER PUBLICATIONS machine translation for WO 2007/028442 (no date).*
machine translation for Japan 2001-063316 (no date).*
International Search Report dated Jul. 2, 2012 of international application PCT/EP2012/057721 on which this application is based.

* cited by examiner

TREAD PROFILE OF A PNEUMATIC VEHICLE TIRE FOR UTILITY VEHICLES

CROSS REFERENCE TO RELATED APPLICATIONS

This application is a continuation application of international patent application PCT/EP2012/057721, filed Apr. 27, 2012, designating the United States and claiming priority from German application 10 2011 050 712.4, filed May 30, 2011, and the entire content of both applications is incorporated herein by reference.

FIELD OF THE INVENTION

The invention relates to a tread profile of a vehicle pneumatic tire for utility vehicles having a tread profile portion which is in the center in the axial direction A of the tire. A shoulder tread portion is provided axially on either side of the central tread profile portion, wherein the central tread profile portion is formed from multiple tread bands arranged axially side by side, each separated from one another by a circumferential groove and aligned in a circumferential direction U—such as circumferential ribs or series of tread blocks, for example—of which the axially outer tread band facing each of the two sides is in each case a first tread band, wherein the shoulder tread portions each comprise a second tread band, which in each case is separated from the next first tread band of the central tread portion by a first circumferential groove, wherein these tread bands are each defined radially outwards by a radially outer surface forming the ground contact surface and are defined in relation to the adjacent circumferential groove with a flank, which forms the groove wall facing the tread band, wherein at least one of the two first circumferential grooves is formed with a web, which is radially raised from the groove base and which extends over the entire circumference of the vehicle pneumatic tire, and which in a radial direction of its extent terminates radially inside the shell surface formed by the radially outer surfaces of the first and second tread bands, and which in an axial direction A divides the first circumferential groove into a first circumferential groove portion adjacent to the first tread band and a second circumferential groove portion adjacent to the second tread band.

BACKGROUND OF THE INVENTION

Such vehicle pneumatic tires are known. For example, such utility vehicle tires having circumferential ribs separated by circumferential grooves are known. In such utility vehicle tires there is a possibility of cracking in the area of the groove base, which is counteracted by various tire design measures. In the case of some particularly demanding tire sizes, which in operation are exposed to exceptionally high stresses, however, the formation of cracks in the groove base is still possible in the transitional area between the shoulder ribs and the adjacent rib of the central tread portion, due to the high stresses acting. To reduce cracking it has already been proposed, on occasion, to form a web in the groove base of the circumferential groove separating these two ribs from one another, so as to divide this circumferential groove in an axial direction A of the tire into two circumferential groove portions, the web extending over the entire circumference but not up to the shell surface of the tire in a radial direction R of the tire. Nevertheless, in such tires cracking in the groove base of this circumferential groove divided by means of the web is still possible in particular applications.

SUMMARY OF THE INVENTION

The object of the invention, therefore, in such vehicle pneumatic tires is to identify simple means for further reducing the possibility of cracks occurring in the groove base.

According to the invention the object is achieved through the formation of a tread profile of a vehicle pneumatic tire for utility vehicles having a tread profile portion which is in the center in the axial direction A of the tire, and having a shoulder tread portion axially on either side of the central tread profile portion, wherein the central tread profile portion is formed from multiple tread bands arranged axially side by side, each separated from one another by a circumferential groove and aligned in a circumferential direction U—such as circumferential ribs or series of tread blocks, for example—of which the axially outer tread band facing each of the two sides is in each case a first tread band, wherein the shoulder tread portions each comprise a second tread band, which in each case is separated from the next first tread band of the central tread portion by a first circumferential groove, wherein these tread bands are each defined radially outwards by a radially outer surface forming the ground contact surface and are defined in relation to the adjacent circumferential groove with a flank, which forms the groove wall facing the tread band, wherein at least one of the two first circumferential grooves is formed with a web, which is radially raised from the groove base and which extends over the entire circumference of the vehicle pneumatic tire, and which in a radial direction of its extent terminates radially inside the shell surface formed by the radially outer surfaces of the first and second tread bands, and which in an axial direction A divides the first circumferential groove into a first circumferential groove portion adjacent to the first tread band and a second circumferential groove portion adjacent to the second tread band, according to an embodiment of the invention, in which the first circumferential groove portion is of narrower design than the second, in which in the cross sectional planes comprising the tire axis the groove base defining the second circumferential groove portion radially inwards is formed with an axially extending portion of length (a) running in a straight line, in which in the cross sectional planes comprising the tire axis the flank of the web facing the second circumferential groove portion extends substantially in a straight line outwards, wherein a curved transitional portion having a radius of curvature $R_2$ is formed between the portion of the groove base extending in a straight line and the web flank, and in which in the cross sectional planes comprising the tire axis the flank of the second tread band facing the second circumferential groove portion extends substantially in a straight line radially outwards, at least in its radially outer area of extent, wherein a curved transition having a radius of curvature $R_3$ with $R_3 > R_2$, is formed starting from the portion of the groove base extending in a straight line to the flank of the second tread band, wherein the portion of the groove base extending in a straight line in an axial direction A is formed rising radially from the transition to the web flank to the transition to the flank of the second tread band, enclosing an angle of inclination $\alpha > 0°$ to the axial direction A.

The asymmetrical division of this circumferential groove formed with a web, with its broader circumferential groove portion towards the shoulder of itself, brings about an improvement in the cracking behavior in this area in the tire critical for cracking in the circumferential grooves. The formation with a cross sectional contour having an inclined groove base rising in a straight line towards the shoulder and having a curved transition towards the web with a groove radius $R_2$, and having a curved transition towards the second tread band on the shoulder side with a radius of curvature $R_3$ which is greater than the radius $R_2$, produces a specific material displacement and reinforcement of the transitional area, facing the shoulder, from the groove base towards the second tread band, which is critical for cracking. This formation produces a better tensile force distribution in the critical areas, which further counteracts the occurrence of cracks. This formation therefore affords a greater safeguard against cracking of the groove base in such tires.

It is particularly advantageous if a tread profile of a vehicle pneumatic tire is formed according to an embodiment of the invention, wherein in the cross sectional planes comprising the tire axis the groove base of the first circumferential groove portion is formed curved with a radius of curvature $R_1$ with $R_1 < R_3$, which on the side facing the web merges tangentially into the web flank defining the first circumferential groove portion and on the side facing the first tread band merges tangentially into the flank of the first tread band defining the first circumferential groove.

It is particularly advantageous if a tread profile of a vehicle pneumatic tire is formed according to an embodiment of the invention, wherein the radii of curvature $R_1$ and $R_2$ are formed with $(0.5\,R_1) \leq R_2 \leq (1.5R_1)$.

It is particularly advantageous if a tread profile of a vehicle pneumatic tire is formed according to an embodiment of the invention, wherein the first circumferential groove in its first circumferential groove portion is formed with a groove depth $t_1$ and in its second circumferential groove portion with a groove depth $t_2$, with $(1.2t_1) \geq t_2 \geq (0.8t_1)$.

It is particularly advantageous if a tread profile of a vehicle pneumatic tire is formed according to an embodiment of the invention, wherein the first circumferential groove in its second circumferential groove portion is formed with a groove depth $t_2$ and in the area of extent of the surface defining the web radially outwards is formed with a groove depth $t_3$ with $(0.5t_2) \geq t_3 \geq (0.1t_2)$.

It is particularly advantageous if a tread profile of a vehicle pneumatic tire is formed according to an embodiment of the invention, wherein the axial distance between the section $S_4$ of the flank of the second tread band, with the radially outer surface of the second tread band, to the section $S_3$ of the web flank defining the second circumferential groove portion with the surface defining the web radially outwards, forms the width $b_2$ of the second circumferential groove portion, wherein the axial distance between the section $S_1$ of the flank of the first tread band, with the radially outer surface of the first tread band, to the section $S_2$ of the web flank defining the first circumferential groove portion, with the surface defining the web radially outwards, forms the width $b_1$ of the first circumferential groove portion, and wherein the widths $b_2$ and $b_1$ are formed with $(2b_1) \leq b_2 \leq (4b_1)$.

It is particularly advantageous if a tread profile of a vehicle pneumatic tire is formed according to an embodiment of the invention, wherein the axial distance between the section $S_4$ of the flank of the second tread band, with the radially outer surface of the second tread band, to the section $S_1$ of the flank of the first tread band, with the radially outer surface of the first tread band, forms the width B of the first circumferential groove, wherein the axial distance between the section $S_3$ of the web flank defining the second circumferential groove portion, with the surface defining the web radially outwards, to the section $S_2$ of the web flank defining the first circumferential groove portion, with the surface defining the web radially outwards, forms the width $b_3$ of the web with $(0.3B) \leq b_3 \leq (0.6B)$.

It is particularly advantageous if a tread profile of a vehicle pneumatic tire is formed according to an embodiment of the invention, wherein the angle of inclination ($\alpha$) is formed with $3° \leq \alpha \leq 20°$.

It is particularly advantageous if a tread profile of a vehicle pneumatic tire is formed according to an embodiment of the invention, wherein a chamfer is formed in the web in the transition between the surface defining the web radially outwards and the web flank facing the second circumferential groove portion. It is thereby additionally possible to counteract stones being caught in the groove and the resulting uncontrolled ejection of stones.

It is particularly advantageous if a tread profile of a vehicle pneumatic tire is formed according to an embodiment of the invention, wherein the first tread band and the second tread band is in each case a circumferential rib.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
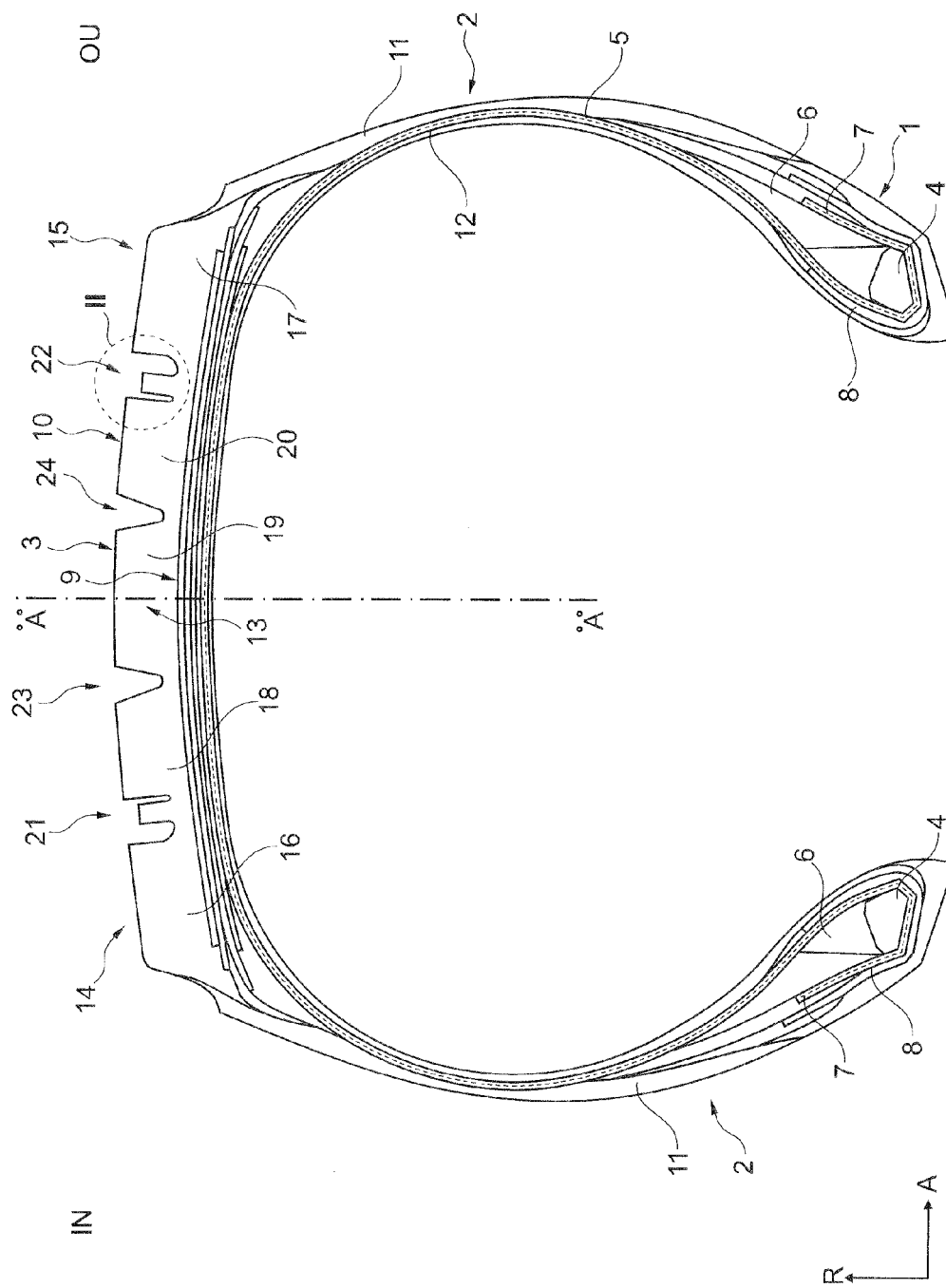
FIG. 1 shows the cross sectional representation of a vehicle pneumatic tire of radial type for utility vehicles.

FIG. 1 shows a utility vehicle pneumatic tire of radial type having two side walls 2 extending in a radial direction R of the vehicle tire and a crown area 3 formed axially therebetween. At the end of their extent, the side walls are each formed facing radially inwards with a bead area 1 wherein a bead core 4 is provided. The bead core 4 is of known type and high tensile strength in a circumferential direction U and is formed extending over the circumference of the tire in a circumferential direction. The bead cores 4 are formed, wound in a known manner, from wire stretched in the circumferential direction U of the vehicle pneumatic tire and embedded in rubber. An apex (bead filler) 6 of hard rubber material of triangular cross section is conventionally formed on the bead cores 4. The vehicle pneumatic tire is formed with a carcass 5, which starting from the bead core 4 formed in the left-hand bead area 1 of the vehicle pneumatic tire extends in a radial direction R of the vehicle pneumatic tire outwards through the left-hand side wall 2 through to the crown area 3 and in the crown area 3 in an axial direction A of the vehicle pneumatic tire to the right-hand side wall 2, and in the right-hand side wall 2 of the vehicle pneumatic tire radially inwards to the bead core 4 formed in the bead area 1 of the right-hand side wall 2.

The carcass is formed extending radially outwards in each of the two bead areas 1 along the axial inside of the bead core 4 to the radial inside of the corresponding bead core 4, then extending in an axial direction along the radial inside of the bead core 4 to the axial outside of the bead core 4, and then extending on the axial outside of the bead core 4 as the turn-up part 7.

With its turn-up part 7, the carcass 5 extends along the axial outside of the apex 6 and terminates on the axial outside of the apex 6. The carcass is formed in a known manner, not represented further, from a casing ply, stretched over the entire circumference of the vehicle pneumatic tire in a circumferential direction U, with parallel cords—for example steel cords—embedded in rubber, which extend substantially in a radial direction R in the area of the side walls 2 and substantially in an axial direction A in the crown area.

An inner layer 12 of known, exceptionally air-impermeable rubber material extends on the side of the carcass 5 facing the inside of the tire from the left-hand bead area 1 to the right-hand bead area 1. In each bead area 1 an additional bead reinforcing strip 8, which extends over the entire circumference of the vehicle pneumatic tire, is formed on the side of the carcass 5 facing away from the bead core 4. The bead reinforcing strip 8, for example, is a strip of material composed of parallel reinforcement elements of textile or metal type embedded in rubber.

On the carcass 5, a belt 9 is formed in the area of the tire crown 3 in a radial direction R of the vehicle pneumatic tire outside the carcass 5. The belt 9 is formed in a known manner from four belt plies arranged over and on top of one another in a radial direction R, for example, and is extended in a circumferential direction U over the entire circumference of the vehicle pneumatic tire and in an axial direction A from the left-hand tire shoulder to the right-hand tire shoulder. On the belt 9, a profiled tread 10 of known type completely covers the belt 9 and extends over the entire circumference of the vehicle pneumatic tire in a circumferential direction U and from the left-hand tire shoulder to the right-hand tire shoulder in an axial direction A. The profiled tread 10 is formed radially outside the belt 9. A side wall rubber strip 11, which extends in a radial direction R from the bead area 1 to the profiled tread 10 in the crown area 3, is formed in a known manner in the area of the tire side walls 2 on the side of the carcass 5 facing axially away from the tire.

As shown in FIG. 1, the profiled tread 10 is formed from a central tread portion 13 with the circumferential ribs 18, 19 and 20 arranged side by side in the axial direction A and from the two shoulder portions 14 and 15 each formed axially outside the central tread portion 13. In the mounted state on the vehicle, the shoulder portion 14 forms the shoulder portion facing the inner side IN of the vehicle. In the mounted state on the vehicle, the shoulder portion 15 forms the shoulder portion facing the outside OU of the vehicle. The shoulder portion 14 is formed with a circumferential rib 16. The shoulder portion 15 is formed with a circumferential rib 17. The circumferential ribs 16, 17, 18, 19 and 20 are each extended over the entire circumference of the vehicle pneumatic tire and aligned in the circumferential direction U of the vehicle pneumatic tire. In an axial direction A of the vehicle pneumatic tire, the circumferential ribs 18 and 19 are separated from one another by a circumferential groove 23 extending over the entire circumference of the vehicle pneumatic tire and aligned in the circumferential direction U. In the axial direction A of the vehicle pneumatic tire, the circumferential rib 19 and the circumferential rib 20 are separated from one another by a circumferential groove 24 extending over the entire circumference of the vehicle pneumatic tire and aligned in the circumferential direction U. The circumferential rib 18 of the central tread portion 13 and the circumferential rib 16 of the shoulder area 14 are separated from one another in an axial direction A by a circumferential groove 21, which extends over the entire circumference of the vehicle pneumatic tire and is aligned in a circumferential direction U. The circumferential rib 20 of the central tread portion 13 and the circumferential rib 17 of the shoulder portion 15 are separated from one another in an axial direction A of the vehicle pneumatic tire by a circumferential groove 22, which is aligned in a circumferential direction U of the vehicle pneumatic tire and extends over the entire circumference of the vehicle pneumatic tire. The circumferential grooves 21 and 22 are formed laterally inverted in relation to one another to the equatorial plane A-A of the vehicle pneumatic tire. The formation of these two circumferential grooves 21 and 22 will therefore be described further below solely with reference to the circumferential groove 22.

Figure 2:
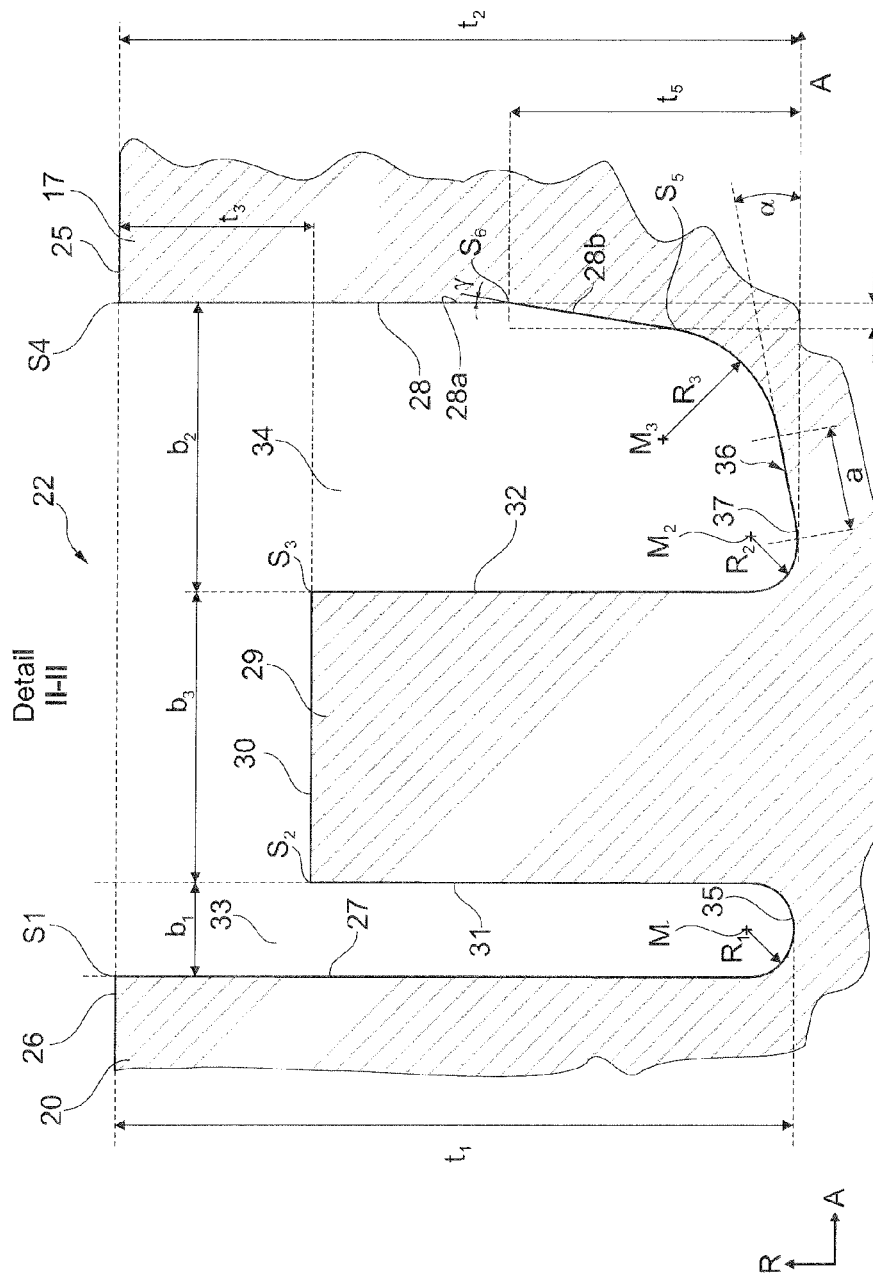
FIG. 2 shows an enlarged cross sectional representation of the detail II of the tread profile in FIG. 1; and, FIG. 3 shows an enlarged cross sectional representation of the detail II of the tread profile in FIG. 1 in an alternative design.

As can be seen from FIG. 2, the circumferential rib 20 is defined in a radially outward direction R by a radially outer surface 26 and the circumferential rib 17 is defined in a radially outward direction R by a radially outer surface 25, the surfaces 26 and 25 each forming the road contact surface and being part of the shell surface of the profiled tread.

A web 29 extends over the entire circumference of the vehicle pneumatic tire and is aligned in a circumferential direction U. The web 29 divides the circumferential groove 22 into a first circumferential groove portion 33 axially facing the circumferential rib 20 and a second circumferential groove portion 34 axially facing the circumferential rib 17. The web 29 is formed in the groove base of the circumferential groove 22. The web 29 is delimited radially outwards by a radially outer surface 30, which, in the cross sectional planes that contain the tire axis, is formed substantially in a straight line. The web 29 is defined towards the circumferential groove portion 33 by a web flank 31 and towards the circumferential groove portion 34 by a web flank 32, which, in the cross sectional planes containing the tire axis, extend running substantially in a straight line in a radial direction R. In the cross sectional planes containing the tire axis, the web flank 31 intersects the radially outer surface 30 at the point of intersection $S_2$ and the web flank 32 intersects the radially outer surface 30 at the point of intersection $S_3$. The circumferential groove portion 33 is delimited radially inwards by a groove base 35, the circumferential groove portion 34 is delimited radially inwards by a groove base 36.

The circumferential groove portion 33 is delimited towards the circumferential rib 20 by the flank 27 of the circumferential rib 20, which faces the circumferential groove 22 and which extends from the groove base 35 of the circumferential groove portion 33 radially outwards, and, in the cross sectional planes containing the tire axis, intersects the radially outer surface 26 at the point of intersection $S_1$. The web flank 31 likewise extends radially outwards from the groove base 35.

In the cross sectional planes containing the tire axis, the groove base 35 is formed running curved radially outwards with a radius of curvature $R_1$, the center of curvature $M_1$ being formed above the lowest point of the circumferential groove portion 33. With its curvature the groove base 35 merges tangentially into the flank 27 and, on the other side, the circumferential groove portion 33 merges tangentially into the web flank 31.

The groove base 36 is formed with an axial portion of length (a), which extends so that it runs in a straight line in the cross sectional planes that contain the tire axis, and which, in an axial direction A in the cross sectional planes containing the tire axis, rises constantly as the radial position increases from the web 29 towards the circumferential rib 17 at an angle of inclination ($\alpha$) to the axial direction A. A transitional contour profile is curved with a radius of curvature $R_2$ in the cross sectional planes containing the tire axis and merges tangentially into the linear portion 37 and tangentially into the contour profile of the web flank 32. The transitional contour profile is formed between the linear extending region 37 and the web flank 32. The center of curvature $M_2$ of the radius of curvature $R_2$ is formed radially outside the lowest point of the groove base 36 of the circumferential groove portion 34. The transition between the portion 37 of the groove base 36 extending in a straight line and the flank 28 of the rib 17 is likewise formed running curved with a radius of curvature $R_3$ in the cross sectional planes containing the tire axis. The center of curvature $M_3$ is formed radially outside the groove base 36 of the circumferential groove portion 34 and merges tangentially both into the portion 37 extending in a straight line and into a portion of the flank 28 of the circumferential rib 17 extending in a straight line.

The radii of curvature $R_1$, $R_2$ and $R_3$ are formed with $R_3 > R_2$ and with $R_1 < R_3$. The radii of curvature $R_1$ and $R_2$ are formed with $(0.5 R_1 \leq R_2 \leq 1.5 R_1)$.

The radial distance between the radially outer surface 26 at the point of intersection $S_1$ to the lowest point of the groove base 35 of the circumferential groove portion 33 is referred to as depth $t_1$. The radial distance between the radially outer surface 25 at the point of intersection $S_4$ to the lowest point of the groove base 36 of the circumferential groove portion 34 is referred to as depth $t_2$. The radial distance of the surface 30 defining the web 29 to the shell surface formed by the radially outer surfaces 26 and 25 is represented by the height $t_3$. The height $t_3$ is measured as the radial distance between the straight-line connection of the points of intersection $S_1$ and $S_4$ to the straight-line connection of the points of intersection $S_2$ and $S_3$. Here the depths $t_1$ and $t_2$ and the height $t_3$ are formed with $(1.2 t_1) \geq t_2 \geq (0.8 t_1)$ and with $(0.5 t_2) \geq t_3 \geq (0.1 t_2)$.

The width $b_1$ of the first circumferentially extending portion 33 is measured as the distance between the point of intersection $S_1$ and $S_2$ measured in an axial direction A of the tire. The width $b_2$ of the second circumferentially extending portion 34 is measured as the distance between the point of intersection $S_3$ and the point of intersection $S_4$ measured in an axial direction A of the tire. The width $b_3$ of the web 29 is measured as the distance between the point of intersection $S_2$ and the point of intersection $S_3$ measured in an axial direction A of the tire. The width B of the circumferential groove 22 is measured as the distance between the point of intersection $S_1$ and the point of intersection $S_4$ measured in an axial direction A of the tire. Here the widths $b_1$, $b_2$, $b_3$ and B are measured so that $(2 b_1) \leq b_2 \leq (4 b_1)$ and $(0.3 B) \leq b_3 \leq (0.6 B)$. For example $b_3 = 0.4 B$.

The angle of inclination ($\alpha$) is formed with $3° \leq \alpha \leq 20°$. In the embodiment shown $\alpha = 10°$.

The length of extent (a) is formed with 0.7 mm $\leq a \leq$ 3.0 mm. For example a=2 mm.

The radius $R_2$ is formed with 0.5 mm $\leq R_2 \leq$ 2 mm. For example $R_2 = 1$ mm. The radius $R_3$ is formed with 2 mm $\leq R_3 \leq$ 5 mmm. For example, the value selected is $R_3 = 3$ mm.

In FIG. 2, a further embodiment is shown wherein the flank 28 of the circumferential rib 17 is formed as a portion 28a extending in a radial direction in its radially outer region of extent and as a portion 28b extending in a straight line in its radially inner area of extent. The portions 28a and 28b intersect at a radial distance $t_5$ from the lowest point of the groove base 36 of the circumferential groove portion 34 radially outside the lowest point at a point of intersection $S_6$, enclosing an angle of intersection ($\gamma$) with $\gamma \leq 5°$, for example with $\gamma = 2°$. The point of intersection $S_6$ here forms a bend of the profile of the flank 28 formed in the cross sectional planes comprising the tire axis. Here the radial distance $t_5$ is formed with $0.5 t_2 \geq t_5 \geq 0.25 t_2$.

Figure 3:
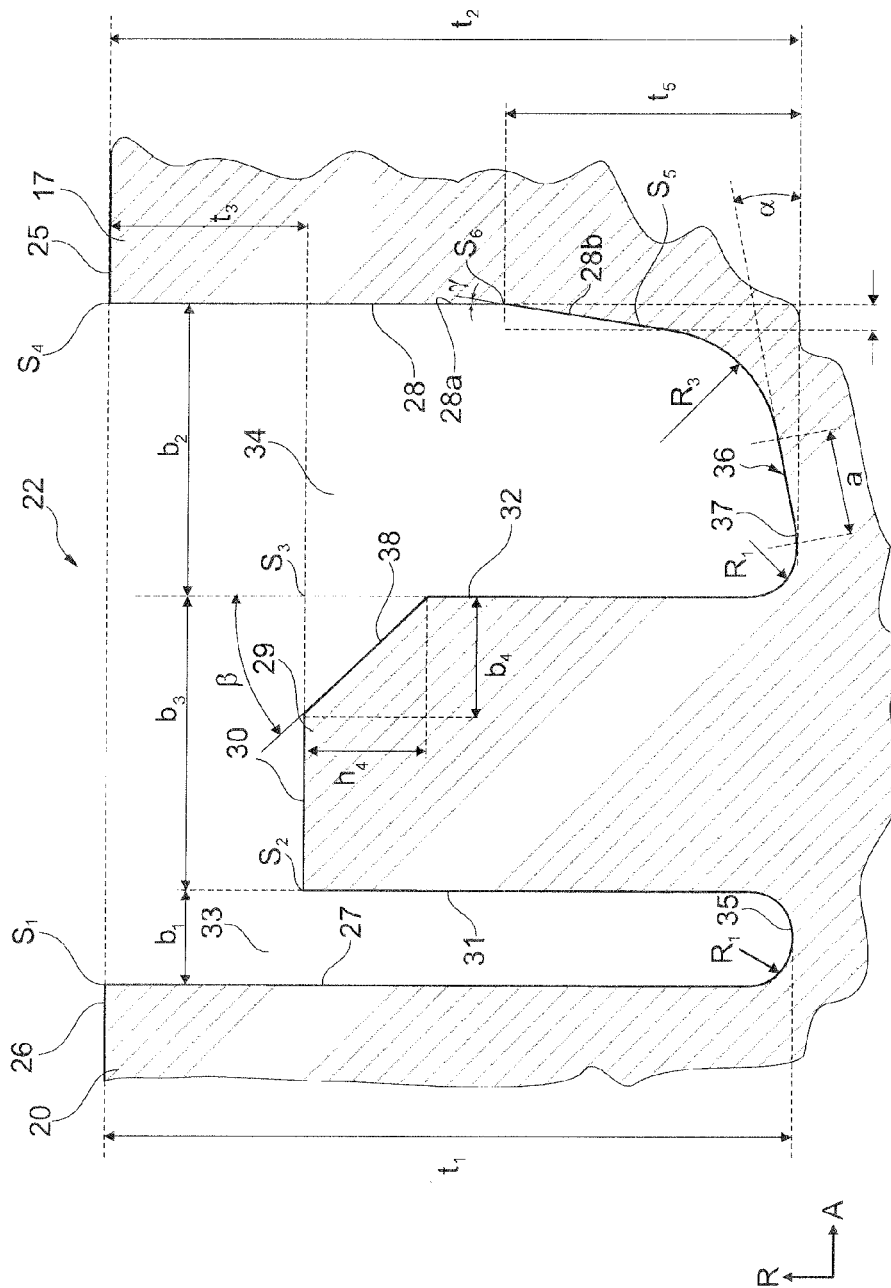

FIG. 3 shows an alternative formation of the web 29, in which the web 29 is formed with a chamfer 38 on the side facing the second circumferential groove portion 34 at the transition between the radially outer surface 30 and the web flank 32. In the cross sectional planes comprising the tire axis, the chamfer 38 is formed inclined in relation to the radial direction R of the vehicle pneumatic tire, enclosing an angle $\beta$, with $30° \leq \beta \leq 60°$. In the embodiment shown, the value selected is $\beta = 45°$. The chamfer 38 intersects the radial outer surface at the axial distance $b_4$ from the point of intersection $S_3$ formed by extending the radially outer surface 30 towards the circumferential groove portion 34 and by extending the web flank 32 radially outwards. The chamfer 38 intersects the web flank 32 at the distance $h_4$ from the point of intersection $S_3$ measured in the radial direction R of the tire. The web width $b_3$ and the radial distance $t_3$ are calculated as described in connection with FIG. 2.

The width $b_4$ is formed with $b_4 \leq (0.5 b_3)$. For example, $b_4 = (\frac{1}{3}) b_3$.

FIG. 2 by way of example represents a utility vehicle tire having a central portion 13 with three radially raised tread bands formed as circumferential ribs (18, 19, 20).

In another embodiment (not shown) the central band 19 of the three tread bands (18, 19, 20) is embodied as a series of tread blocks of known type. In another embodiment (not shown) the three tread bands (18, 19, 20) of the central portion 13 are embodied as a series of tread blocks of known type.

In another embodiment (not shown) a utility vehicle tire is formed with a central portion 13 having two to six radially raised tread bands extending over the circumference. In one embodiment these bands are formed as circumferential ribs and in another embodiment as a series of tread blocks of known type.

In another embodiment (not shown) the tread bands 16 and 17 adjoining the circumferential grooves 21 and 22 are not formed as circumferential ribs—as represented in FIG. 2 and described above—but in a similar manner as a series of tread blocks of known type.

It is understood that the foregoing description is that of the preferred embodiments of the invention and that various changes and modifications may be made thereto without departing from the spirit and scope of the invention as defined in the appended claims.

LIST OF REFERENCE NUMERALS

Part of the Description 1 bead area
2 side wall
3 crown area
4 bead core
5 carcass
6 apex
7 turn-up
8 bead reinforcing strip
9 belt
10 tread
11 side wall rubber strip
12 inner layer 13 central portion
14 shoulder portion
15 shoulder portion
16 circumferential rib
17 circumferential rib
18 circumferential rib
19 circumferential rib
20 circumferential rib
21 circumferential groove
22 circumferential groove
23 circumferential groove
24 circumferential groove
25 radially outer surface
26 radially outer surface
27 flank
28 flank
29 web
30 radially outer surface
31 web flank
32 web flank
33 circumferential groove portion
34 circumferential groove portion
35 groove base
36 groove base
37 linear extending region
38 chamfer

What is claimed is:

1. A tread profile of a pneumatic vehicle tire for utility vehicles, the pneumatic vehicle tire having a tire axis defining an axial direction (A), wherein the tread profile comprises:

at least first, second and third profile bands aligned in a peripheral direction (U);

said first and said second profile bands being arranged mutually adjacent to each other and defining a first circumferential groove therebetween;

said second and said third profile bands being arranged axially mutually adjacent to each other and defining a second circumferential groove therebetween;

said first, second and third profile bands conjointly defining a center tread profile section having a first side in the axial direction (A) and a second side in the direction opposite the axial direction (A);

said first and third profile bands being left and right outermost profile bands;

a first shoulder profile section disposed on said first side of said center tread profile section;

a second shoulder profile section disposed on said second side of said center tread profile section;

said first shoulder profile section and said left outermost profile band conjointly defining a third circumferential groove;

said second shoulder profile section and said right outermost profile band conjointly defining a fourth circumferential groove;

said first shoulder profile section, said left outermost profile band, said right outermost profile band and said second shoulder profile section having respective outer surfaces defining respective ground contact surfaces;

said first shoulder profile section having a first flank which forms a first groove wall of said third groove;

said first profile band having a second flank which forms a second groove wall of said third groove;

said second shoulder profile section having a first flank which forms a first groove wall of said fourth groove;

said third profile band having a second flank which forms a second groove wall of said fourth groove;

said third and fourth grooves defining respective bases thereof;

said third and fourth grooves having a web formed therein extending radially from the base thereof and extending over the entire circumference of said tire;

the outer surfaces of said first shoulder profile section and said left outermost profile band conjointly defining a shell plane extending over said third groove;

said web ending in its radial extension below said shell plane;

said web partitioning said fourth groove in said axial direction (A) into a first circumferential groove section bordering on said right outermost profile band and a second circumferential groove section bordering on said second shoulder profile section;

said first circumferential groove section being narrower than said second circumferential groove section;

said second circumferential groove section having a second groove base having a linearly extending axial extension section of length (a) in cross sectional planes containing said tire axis;

said second groove base radially inwardly delimiting said second groove section;

said web having a first web flank facing toward said second circumferential groove section;

said first web flank extending essentially linearly outwardly in cross sectional planes containing said tire axis;

said second circumferential groove section having a first curved transitional segment between said linearly extending axial extension and said first web flank;

said first curved transitional segment having a first curve radius ($R_2$);

said first flank of said second shoulder profile section facing toward said second circumferential groove section;

said first flank of said second shoulder profile section having a radially outer extension region and extending linearly radially outwardly in said radially outer extension region;

said second circumferential groove section having a second curved transitional segment between said linearly extending axial extension and said first flank of said second shoulder profile section;

said second curved transitional segment having a second curved radius ($R_3$) wherein ($R_3 > R_2$);

said linearly extending axial extension extending radially upward from said first curved transitional segment to said second curved transitional segment; and, said linearly extending axial extension and said axial direction (A) conjointly defining an inclination angle ($\alpha$) lying in a range of $3° \leq \alpha \leq 20°$.

2. The tread profile of claim 1, wherein:

said first circumferential groove section has a first groove base having a third curved radius ($R_1$) wherein ($R_1 < R_3$) in cross sectional planes containing said tire axis;

said web has a second web flank delimiting said first circumferential groove section;

said third curved radius ($R_1$) has an end facing toward said web and transitions tangentially into said second web flank at said end; and, said third curved radius ($R_1$) has an end facing toward said second flank of said third profile band and transitions tangentially into said second flank of said third profile band.

3. The tread profile of claim 2, wherein said first curved radius ($R_2$) and said third curved radius ($R_1$) are configured such that $(0.5R_1) \leq R_2 \leq (1.5R_1)$.

4. The tread profile of claim 1, wherein said first circumferential groove section has a first depth ($t_1$); and, said second circumferential groove section has a second depth ($t_2$) wherein $(1.2t_1) \geq t_2 \geq (0.8t_1)$.

5. The tread profile of claim 1, wherein:
said second circumferential groove section has a second depth ($t_2$);
said web has a radially outer extension delimiting surface in a web radial extension region;
said groove has a depth ($t_3$) in said radial extension region, wherein $(0.5t_2) \geq t_3 \geq (0.1t_2)$.

6. The tread profile of claim 1, wherein:
the axial distance between the intercept (S4) of said first flank of said second shoulder profile section with the radial outer surface of said second shoulder profile section and the intercept (S3) of said web flank delimiting said second circumferential groove section with the surface delimiting said web radially outwardly forms the width ($b_2$) of said second circumferential groove section;
the axial distance between the intercept (S1) of said second flank of said third profile band with the radial outer surface of said third profile band and the intercept (S2) of a web flank delimiting said first circumferential groove section with the surface delimiting said web radially outwardly forms the width ($b_1$) of said first circumferential groove section; and,
said widths ($b_2$) and ($b_1$) are configured with: $(2b_1) \leq b_2 \leq (4b_1)$.

7. The tread profile of claim 1, wherein:
the axial distance between the intercept (S4) of said first flank of said second shoulder profile section with the radial outer surface of said second shoulder profile section and the intercept (S1) of said second flank of said third profile band with the radial outer surface of said third profile band forms the width (B) of said fourth circumferential groove; and,
the axial distance between the intercept (S3) of the web flank delimiting said second circumferential groove section with the surface delimiting said web radially outwardly and the intercept (S2) of said web flank delimiting said first circumferential groove section with the surface delimiting said web radially outwardly forms the width ($b_3$) of said web wherein $(0.3B) \leq b_3 \leq (0.6B)$.

8. The tread profile of claim 1, wherein said web has a radially outward web delimiting surface; and, said web further has a chamfer between said radially outwardly web delimiting surface and said web flank.

9. The tread profile of claim 1, wherein each of said left outermost profile band, said right outermost profile band, said first shoulder profile section and said second shoulder profile section are a circumferential rib.

10. The tread profile of claim 1, wherein said first, second and third profile bands are one of circumferential ribs and profile block rows.

* * * * *